United States Patent [19]
Cushing

[11] 4,089,218
[45] May 16, 1978

[54] ELECTROMAGNETIC WATER CURRENT METER WITH STAGGERED STICK OUT ELECTRODES

[76] Inventor: Vincent J. Cushing, 410 Standish Dr., Deerfield, Ill. 60015

[21] Appl. No.: 755,293

[22] Filed: Dec. 29, 1976

[51] Int. Cl.² ............................................... G01F 1/58
[52] U.S. Cl. ................................. 73/189; 73/194 EM
[58] Field of Search .................... 73/181, 189, 194 EM

[56] References Cited

U.S. PATENT DOCUMENTS

| | | | |
|---|---|---|---|
| 3,161,047 | 12/1964 | Griswold | 73/181 X |
| 3,343,414 | 9/1967 | Cason | 73/194 EM |
| 3,898,881 | 8/1975 | Darby, Jr. | 73/181 |
| 4,000,648 | 1/1977 | Olson | 73/189 |

*Primary Examiner*—Charles A. Ruehl
*Attorney, Agent, or Firm*—Pollock, Vande Sande & Priddy

[57] ABSTRACT

An electromagnetic water current meter includes a cylindrical transducer body of circular cross-section with two pairs of electrodes, each pair of electrodes rotated 90° around the transducer axis with respect to the other pair. Each electrode extends beyond the surface of the body of the transducer and each pair of electrodes lie in a plane perpendicular to the longitudinal axis of the transducer. The planes of each of the pairs of electrodes are offset with respect to each other preferably by a distance equal to the diameter of the transducer. Each electrode is preferably of the form of a truncated cone.

5 Claims, 5 Drawing Figures

ELECTROMAGNETIC WATER CURRENT METER WITH STAGGERED STICK OUT ELECTRODES

FIELD OF THE INVENTION

The present invention relates to electromagnetic water current meters.

BACKGROUND OF THE INVENTION

Electromagnetic water current meters are known to the art and typically include an electromagnetic coil mounted in a transducer body which may be of cylindrical form preferably with circular cross-section. Mounted at or near the surface of the transducer body are plural electrodes from which voltages are sensed by circuitry which processes the voltages and produces a signal related to water current velocity. It has been known for some time that under certain conditions it is desirable for the electrodes to project beyond the surface of the body of the transducer, i.e., to stick-out. See for example, my article in OCEANS '76 entitled "Electromagnetic Water Current Meter" presented at the Second Annual Conference of the Marine Technology Society and the Institute of Electrical and Electronics Engineers (September 15, 1976). See also "The Theory of Induced Voltage Electromagnetic Flow Meters", Bevir appearing in the *Journal of Fluid Mechanics*, Volume 43, part III, pages 577–590 (1970); "Measurements of Turbulent Fluctuation and Reynolds Stresses in a Tidal Current", Bowden et al, appearing in the *Proceedings of the Royal Society (London) Series A*, Volume 237 pages 422–38 (1956); "Electrodes for Magnetic Flow Meters", Gray, appearing in *Water and Sewage Works (London)*, page R-93 (August 1972); "The Measurement of Sea Water Velocities by Electromagnetic Induction", Guelke et al, appearing in the *Journal of the Institution of Electrical Engineers,* Volume 94 part II, page 71 (1947); "The Theory of Electromagnetic Flow Measurement", Shercliff page 90 (Cambridge University Press, New York 1962); "A Two Component Electromagnetic Ship's Log", Tucker et al, appearing in the *Journal of the Institute of Navigation,* Volume 23, Page 302 (1970); "Electromagnetic Current Meters", Tucker, appearing in the *Proceedings of the Society of Underwater Technology,* (London) Page 53 (1972); and, "Electromagnetic Flow Metering", Webb, appearing in *Institute of Technology*, ISA March 1974.

Briefly stated, it is known that ideal flow going past a cylindrical electromagnetic water current meter can yield perfect cosine response. Ideal flow means that the fluid flow is described by potential theory, i.e., the flow has no vorticity. At the same time, it is also well known that real flow past a cylinder or sphere can be described in terms of two regions, the boundary layer region which is very thin next to the sensor or transducer wall and the potential flow region which exists everywhere except for this thin boundary region. Thus, by providing protruding electrodes, the sensitive area of the electrode extends beyond the transducer wall, and the boundary layer and into the region of potential flow for accurate measurement thereof. Inasmuch as the transducer is designed to sense fluid flow regardless of direction, and hence, has two pairs of electrodes, each pair spaced by 90°, if the fluid flow is directed directly at one of the diameters on which a pair of electrodes is located, that pair of electrodes will sense voltages proportional to the flow, and the other pair of electrodes will sense no flow at all. However, if the flow is not directed directly at a diameter on which a pair of electrodes exist, and this of course is typically the case, then a protruding electrode wil be in the wake of another electrode. The presence of the wake will disturb the velocity flow past the electrode which lies within it, resulting in less than ideal operation of the transducer.

It is therefore, one object of the present invention to provide electromagnetic water current meter having a transducer with stick-out electrodes while reducing the possibility that one of the electrodes will lie in the wake of another.

SUMMARY OF THE INVENTION

The present invention meets the foregoing objects, and other objects which will become clear hereinafter, by providing an electromagnetic water current meter with a transducer of circular cross-section having two pairs of electrodes, each pair of electrodes lying on a diameter of the transducer body, each of the diameters being rotated 90° with respect to the other, each pair of electrodes lying in a plane perpendicular to the longitudinal axis of the transducer with the planes being staggered or offset from each other.

BRIEF DESCRIPTION OF THE DRAWINGS

The present invention will now be described in more detail with reference to the attached drawings in which.

DETAILED DESCRIPTION OF THE INVENTION

Figure 1:
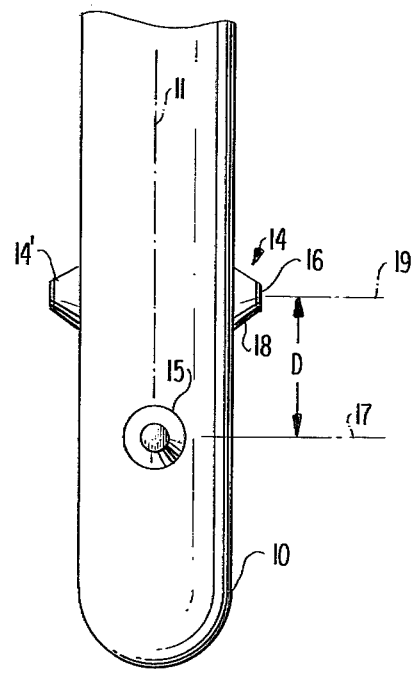
FIG. 1 is a side view of typical cylindrical transducer.

FIG. 1 is a side-view of a cylindrical transducer of circular cross-section for an electromagnetic flow meter. In many respects, the transducer is conventional. Included in the transducer (but not illustrated) is an electromagnet for generating a magnetic field. The transducer includes two pairs of electrodes, one pair 14 and 14', and a second pair 15 and 15' (electrode 15' being hidden in the view of FIG. 1). Each pair of electrodes lies on a diameter of the circular cross-section of the cylinder, and the diameters of the electrodes are rotated 90° with respect to each other. Each of the electrodes is a stick-out electrode including a sensitive surface area 16. The stick-out electrodes may be (although not necessarily) in the form of a truncated cone (as illustrated) wherein the cone includes an angle of from 20° to 30° for example. The flanks of the cone are insulated by epoxy or other similar material so as to leave only a sensitive area 16 for sensing flow velocities. The sensitive area of the electrode 16 is arranged to extend beyond the boundary layer. For a typical transducer having a ¾ inch diameter, the electrodes may protrude, for example, 1/16 inch beyond the surface of the transducer.

In order to improve the performance of the transducer, each pair of electrodes lies in different plane perpendicular to the longitudinal axis 11 of the transducer. For example, the electrode pair 15–15' lies in a plane 17, and the electrode pair 14–14' lies in a different plane 19. The planes 17 and 19 are each perpendicular to the axis 11 and are separated by a distance D. In order to point out the problem and the manner in which staggering of the electrodes, as shown in FIG. 1, overcomes that problem reference is now made to FIGS. 2A through 2D.

Figure 2A:
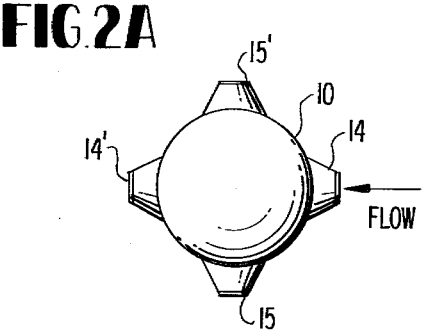
FIGS. 2A and 2B illustrate cross-sections of the transducer under different flow conditions.

FIG. 2A is a cross-section of the transducer 10 showing all the electrodes, in schematic form. When the transducer 10 is placed in its intended environment, and the flow has the direction indicated by the arrow labelled "Flow" in FIG. 2A, an electrode pair 14-14' will have voltages induced therein proportional to the velocity of the flow, and the electrode pair 15-15' will not sense any flow velocity, since there is no component of flow parallel to the axis 15-15'. Rotating the transducer 10 by 90° produces the same result except that now the electrodes 15-15' read the flow velocity while the electrodes 14-14' will not sense any velocity.

Figure 2B:
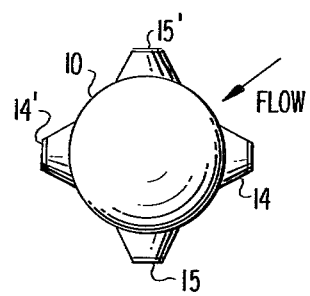
Figure 2C:
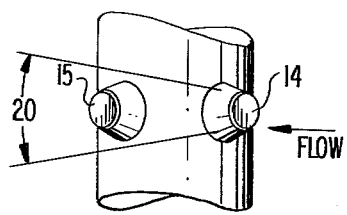
FIGS. 2C and 2D illustrate the effect of staggering the electrodes.

FIG. 2B is a similar cross-section of the transducer 10 also showing the electrodes, but now the flow has the direction indicated by the arrow labelled "Flow", which is not parallel to either of the diameters on which the electrodes exist. FIG. 2C is a side view illustrating the electrodes 15 and 14 along with the flow direction. Because of the protrusion of electrode 14, the fluid velocity produces a disturbance, or wake, in which lines 20 represent streamlines thereof. The wake actually produced, of course, expands in three dimensions, although only two dimensions are illustrated in FIG. 2C. As is illustrated in FIG. 2C, the electrode 15 lies within the wake. As a result, the velocity sensed by the electrode 15 is disturbed by the wake. At the very least this degrades the performance of the transducer.

Figure 2D:
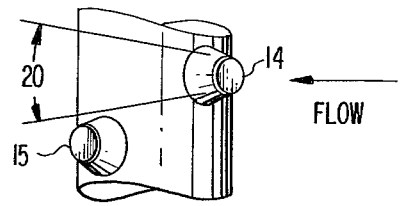

With the transducer of the present invention, this difficulty is avoided by offsetting the electrodes. FIG. 2D shows a side view of a transducer in accordance with the present invention under the same conditions as that shown in FIG. 2C. However, as is illustrated in FIG. 2D, the electrode 15 does not lie within the wake created by the electrode 14, since the electrodes 14 and 15 do not lie in the same plane perpendicular to the axis 11.

If the transducer 10 is intended for an environment which limits the flow velocity to a direction perpendicular to its longitudinal axis, i.e., axis 11, then the minimum offset, that is, minimum value of D, can be slightly larger than the electrode diameter.

Most real transducers, however, are subjected to flows which are not limited to directions perpendicular to their axis 11. As will be understood by those skilled in the art, as the component of flow velocity parallel to the axis 11 increases, the minimum stagger, or offset, required to prevent an electrode from lying within the wake of another electrode, increases. For example, if a transducer is moored to a buoy, which is floating on the surface of a body of water, the action of water flow will cause the transducer to tilt. To prevent wake from one electrode from distrubing another electrode, the minimum offset has to be increased because of this tilt. The stagger distance cannot be increased to accept any arbitrarily large tilt angle. Preferably the stagger distance is arranged to allow a reasonable degree of tilt. Reasonable amounts of tilt may be angles on the order of 15°–20° with a 2-1 safety factor, the stagger distance will be arranged to accept tilt angles of 40°–45°, for example.

Although the precise offset distance can best be determined experimentally, a reasonable offset for these circumstances is approximately 1 transducer diameter.

I claim:

1. An electromagnetic flow transducer including a generally cylindrical body of circular cross-section and having two pairs of electrodes, each pair of electrodes lying on different diameters of said cylinder, each of said diameters rotated 90° with respect to the other, each electrode protruding beyond the surface of said transducer, wherein the improvement comprises staggering each pair of electrodes from another pair by an offset distance along a longitudinal axis of said cylinder.

2. The transducer of claim 1 wherein each of said electrodes is in the form of a truncated cone and said offset distance is at least equal to an electrode diameter.

3. The transducer of claim 1 wherein said offset distance is on the order of a diameter of said cylindrical body.

4. The transducer of claim 3 wherein each of said electrodes is in the form of a truncated cone, the flanks of which are insulated and which has a sensitive area at the outermost extremity of the truncated cone.

5. The transducer of claim 1 wherein said electrodes are in the form of a truncated cone, and wherein said offset distance is at least equal to an electrode diameter described by the intersection of said electrode with said cylindrical body of said transducer.

* * * * *